United States Patent [19]
Forbes et al.

[11] Patent Number: 5,162,083
[45] Date of Patent: Nov. 10, 1992

[54] INDIVIDUAL HOME WASTEWATER TREATMENT PLANT CONVERSION APPARATUS

[76] Inventors: Lee W. Forbes, 10795 Mead Rd., Apt. 1712, Baton Rouge, La. 70816; Stephen D. Field, 26320 S. Satsuma Rd., Livingston, La. 70754

[21] Appl. No.: 691,815

[22] Filed: Apr. 26, 1991

[51] Int. Cl.[5] ........................................... B01D 21/00
[52] U.S. Cl. .................................. 210/199; 210/207; 210/532.2
[58] Field of Search ...................... 210/170, 207, 532.2, 210/629, 220, 199, 221.2, 521, 522, 630

[56] References Cited

U.S. PATENT DOCUMENTS

| | | | |
|---|---|---|---|
| 2,987,186 | 6/1961 | Burgoon et al. | 210/532.2 |
| 3,051,315 | 8/1962 | Boester | 210/532.2 |
| 3,149,071 | 9/1964 | Burgoon et al. | 210/532.2 |
| 3,210,053 | 10/1965 | Boester | 210/208 |
| 3,477,949 | 11/1969 | Liljendahl | 210/752 |
| 3,819,054 | 6/1974 | Long et al. | 210/199 |
| 3,907,672 | 9/1975 | Milne | 210/199 |
| 4,054,524 | 10/1977 | Mackrie et al. | 210/208 |
| 4,211,657 | 7/1980 | Etlin | 210/195.4 |
| 4,224,155 | 9/1980 | Milne | 210/195.3 |
| 4,325,823 | 4/1982 | Graham | 210/532.2 |
| 4,664,795 | 5/1987 | Stegall et al. | 210/532.2 |
| 4,686,045 | 8/1987 | McKee | 210/532.2 |
| 4,834,879 | 5/1989 | Stegall et al. | 210/532.2 |
| 4,859,325 | 8/1989 | Cormier | 210/195.3 |
| 4,882,046 | 11/1989 | Waite | 210/532.2 |
| 4,983,285 | 1/1991 | Nolen | 210/197 |

FOREIGN PATENT DOCUMENTS 1393792 5/1980 U.S.S.R. .
89003722 5/1989 World Int. Prop. O. .

Primary Examiner—Stanley S. Silverman
Assistant Examiner—Robert James Popovics
Attorney, Agent, or Firm—C. J. Husar

[57] ABSTRACT

The disclosure pertains to a method and apparatus for converting a standard anaerobic septic tank system to an aerobic system where the effluent discharged has a high level of quality, sufficient to meet or exceed all known national and state standards. The method provides a series of steps that are used to convert a pre-existing anaerobic septic tank to a highly efficient aerobic system. Additionally, there has been provided an apparatus for individual home wastewater treatment that is designed for new construction units. The conversion and new construction units are highly effective in geographical regions where the native soils have inadequate percolating capacity and also areas in which the groundwater table is very near the surface. Both of these units include an aeration and a clarifier insert with the capability of adding an optional chlorine chamber which dispenses chlorine into the effluent line in its final stages. Although only a single clarifier unit is used in each installation, provision is made for a plurality of clarifier insert configurations, any of which will meet the high quality standards indicated above.

9 Claims, 4 Drawing Sheets

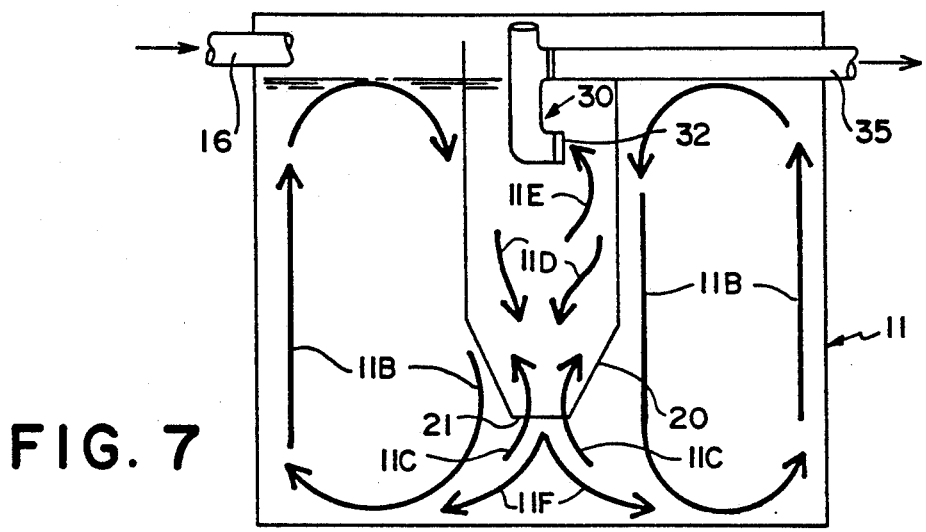
FIG. 7
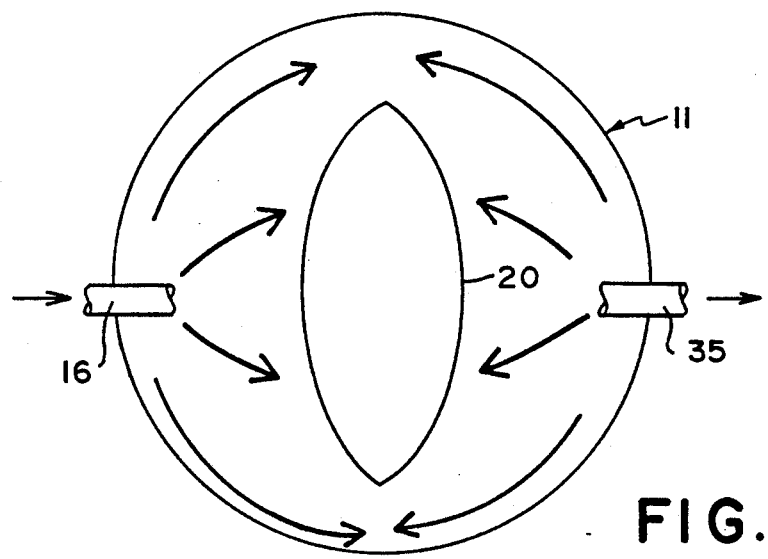
FIG. 8
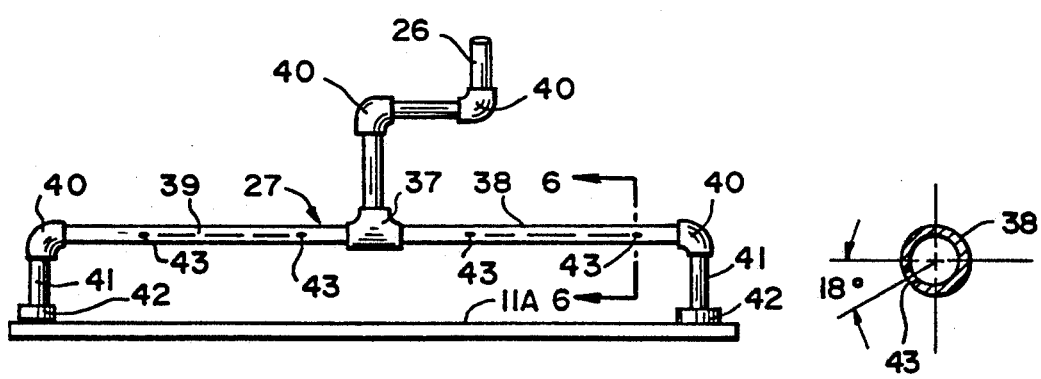
FIG. 5
FIG. 6

INDIVIDUAL HOME WASTEWATER TREATMENT PLANT CONVERSION APPARATUS

BACKGROUND OF THE INVENTION

The present invention relates to wastewater systems and more specifically it relates to a method of converting a standard anaerobic septic tank to an aerobic system wherein the effluent has much improved quality. Additionally, the subject matter of this invention relates to a wastewater treatment system for new installations which are located in geographical areas where the native soils have inadequate percloating capacity as determined by a standard percloation test and also areas in which the groundwater table is very near the surface.

As is well known, standard septic tank systems for individual home wastewater treatment have been in use for over 100 years. Anaerobic digestion is the primary treatment process in the system and occurs in the septic tank. Since the effluent from septic tanks very rarely meets point source discharge requirements, a tile drain field normally serves as the final polishing step. In the tile field, the septic tank effluent is discharged through distribution pipes (tiles) to an encompassing gravel trench, or sand bed and the treated effluent percolates into the native soils where dispersion of the effluent to surrounding soils and the local ground water table occurs. If installed correctly in an area where the soils percolate adequately, these systems provide adequate domestic wastewater treatment. The septic tank's strongest attributes are their low cost and the fact that they have no mechanical parts, and therefore minimal maintenance.

Native soils which have inadequate percolating capacity, as determined by a standard percolation test, are unsuitable for tile field placement, and the septic tank treatment system becomes inadequate. Also, if the local groundwater table is very near the surface, it may come into contact with the partially treated septic tank effluent before final treatment can occur in the tile field. This situation is also unsuitable for septic tank systems. Unfortunately, millions of such septic tank systems were installed as onsite wastewater disposal systems in areas where the percolation requirements of the native soils could not be met and or the local groundwater table is near the surface.

The density of these inadequate systems, have in recent years, been shown to have imparted a large detrimental environmental impact on water supplies, and in coastal areas, on wetlands. The human health issues imposed by this impact, and the possibility of additional detrimental environmental impact which might be imparted by inadequate systems installed in new construction, have driven many states to adopt regulations associated with individual home wastewater treatment and in particular, the restricted use of septic tank systems. Two issues are currently being addressed by many states regarding individual home wastewater treatment (onsite wastewater disposal) and its environmental impact. The first is how to remediate those inadequate septic tank systems which are already in place. The second is to assure that all onsite wastewater treatment systems installed in new construction provide adequate wastewater treatment. Many states have addressed both of these issues in a single policy. As a result thereof, many states now require, for both existing systems and new construction, either: a septic tank system where the tile drain field is installed in soils capable of percolating to state defined standards and the local groundwater table is at a sufficient depth; or, the modification to or replacement of the septic tank system with a system in which the effluent leaving the last sealed tankage of the system meets state defined water quality standards.

PRIOR ART SYSTEMS

In view of the above discussed problems relating to individual home wastewater systems there have been many products introduced to address the scenario where the percolation properties of soils in a given area do not meet the above described standards, and the septic tank systems are deemed inadequate. The most commonly exploited process has been the replacement of or addition to the septic system with individual aerobic wastewater treatment plants. These systems, whether replacement of or an addition to the old septic tank system are a costly and labor intensive type of installation requiring the use of heavy machinery and the usual mess associated with such an installation.

Although these aerobic systems can comply with the treatment requirements and can be used in any individual wastewater treatment application, provided the proper sizing for expected flowrates is incorporated, they have several economic and aesthetic drawbacks. When used to replace an existing septic tank system, or placed in series with an existing septic tank, they require excavation equipment and hoisting systems. This equipment is costly, and the cost is passed on to the owner through unit costs. The equipment also can, and usually does, cause major damage to a yard, particularly when the ground is wet. Also, the high costs of the equipment makes it expensive for potential dealers to get into business.

SUMMARY OF THE INVENTION

In view of the many and varied nature of problems associated with the prior art systems as discussed above, applicants have developed an economical and less destructive method of converting a conventional anaerobic septic tank system into an efficient aerobic wastewater treatment system while minimizing costs and destruction of property and/or landscapes. In one aspect, the old lid is removed and modified, an aeration and clarifier insert are then installed in the old septic tank, and after the necessary piping connection and adjustments are made, the old septic tank will function as an aerobic system which meets and even exceeds the effluent water quality standards of all states and also the National Sanitary Foundation (NSF) as set forth in NSF standard 40.

In some instances, it may be necessary to provide a new lid, in addition to the usual aeration manifolds and clarifier at the time of conversion. Additionally, applicants have provided a new and improved wastewater treatment system for new construction that utilizes the same elements of the above described conversion system with a new lid and tank and provides the same high quality effluent as in the conversion system. Therefore, it will be seen, that applicants have provided a method of converting old inefficient septic tank systems to a high quality effluent system and also provided a new high quality wastewater treatment system for new construction purposes.

OBJECTS OF THE INVENTION

An object of the invention is to provide a method of converting an existing anaerobic septic tank system to an efficient aerobic wastewater treatment system.

Another object of the invention is to provide a method of converting an existing anaerobic septic tank system to an aerobic wastewater treatment system which meets NSF Standard 40 effluent treated quality standards wherein certain components of the existing septic tank system are retained and an insert is positioned therein.

A further object of the invention is to provide an individual home wastewater treatment system for new construction which meets NSF standard 40 for treated effluent quality standards including many geographical areas where high water tables exist or the percolation capacity of the soils is inadequate.

A still further object of the invention is to provide a new and improved aeration system which cooperates with a unique clarifier to provide high quality effluent.

Yet another object of the invention is to provide a method of converting and also a new individual wastewater treatment system wherein the related costs and installation damage are kept to a minimum.

A further object of the invention is to provide a clarifier insert that includes an adjustment system thus permitting its use in a variety of tank sizes and configurations.

A still further object of the invention is to provide a pair of air diffuser assemblies uniquely positioned relative to the influent and effluent sides of the septic tank/aeration chamber to produce a highly effective flow regime therein.

These and other objects of the instant invention will become more apparent hereinafter. The instant invention will now be described with particular reference to the accompanying drawings which form a part of this specification wherein like reference characters designate the corresponding parts in the several views.

BRIEF DESCRIPTION OF THE DRAWINGS

FIG. 5 is an illustration of a diffuser bar illustrating the manner in which the support feet engage the bottom of the tank.

FIG. 6 is a sectional view taken along the plane 6—6 of FIG. 5 illustrating the angle of aeration apertures in the diffuser bar.

FIG. 7 is a vertical schematic illustration of the generated flow regime within the tank.

FIG. 8 is a plan view of the tank with a schematic illustration of the flow regime therein.

DETAILED DESCRIPTION OF THE DRAWINGS

Figure 1:
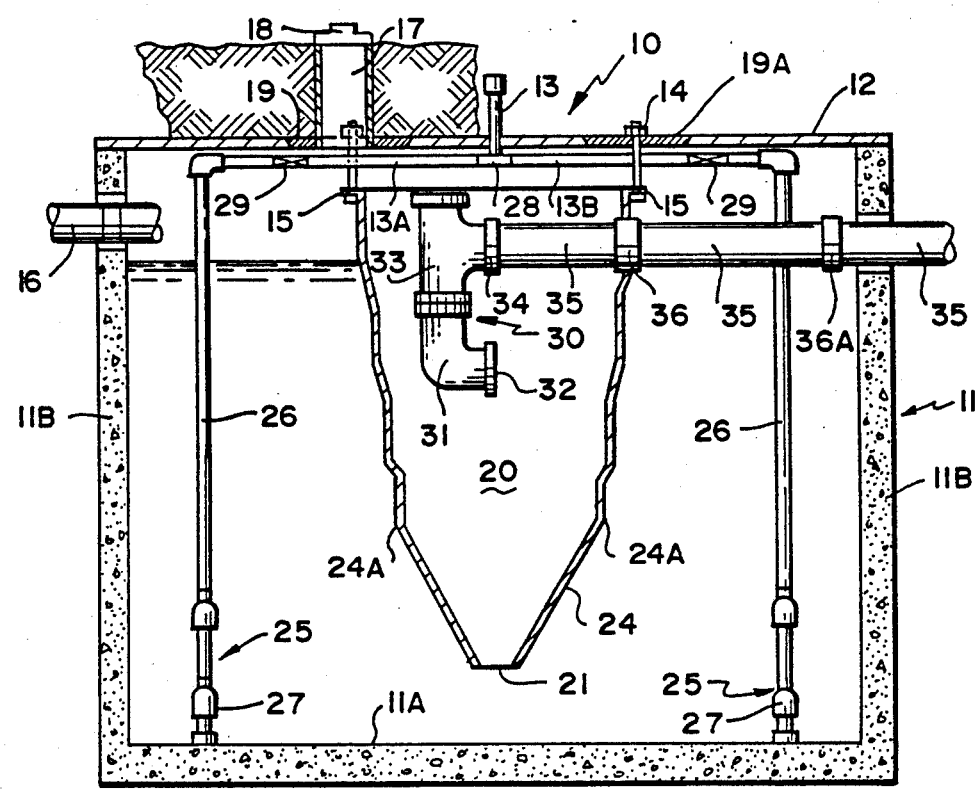
FIG. 1 is a vertical sectional view of a septic tank which has been converted to an aerobic system through the addition of applicant's novel clarifier insert/aeration system taken along the plane 1—1 of FIG. 2.

Referring now to FIG. 1, there is shown a sectional view of an individual home wastewater treatment system generally indicated by reference numeral 10. As illustrated, the old septic tank 11 has been converted to an efficient aerobic system. Tank lid 12 has been modified to provide the necessary apertures for air inlet line 13, and suspension bolts 14 that are secured to flanges 15, providing the necessary support for clarifier insert 20, shown in section. The details of suspension bolts 14 will be described later with respect to FIG. 4. Aeration system 25 which is operably connected to air inlet line 13 receives air therefrom and a piping assembly directs the incoming air to a pair of air diffuser risers 26 thence to their respective air diffuser bar assemblies 27. The details will be disclosed in the discussion of FIG. 7.

Through the upper wall 11B of old septic tank 11 is an appropriately sealed opening permitting influent line 16 to extend into the interior thereof and discharge the wastewater therein. Also seen in this view is inspection riser 17 and its removable cap 18. Inspection riser 17 is securely positioned in and extends upwardly from inspection port cover 19. Air inlet line 13 connects to piping tee 28 with horizontal piping 13A and 13B connected to the left and right sides, respectively, of tee 28. A flow control valve 29 is mounted in each leg of tee 28 and downstream of valves 29 a 90 degree elbow connects with the respective air diffuser risers 26 to supply air to air diffuser bar assemblies 27.

Centrally located within tank 11 is clarifier insert 20 which is adjustably suspended from tank lid 12 by adjustment bolts 14 and flanges 15. As shown, clarifier insert 20 has a generally downwardly conical shape with its inlet 21 positioned a predetermined distance from bottom 11A of tank 11. Operably located within clarifier insert 20 at the upper end thereof is effluent discharge assembly 30 which comprises a 90 degree elbow 31, having an inlet end 32 that is secured to tee 33 which is positioned vertically with central opening 34 connected to horizontal piping 35. The position and arrangement of the effluent discharge assembly 30, with vertical inlet end 32 positioned below the water level in the clarifier insert 20, prohibits any untreated waste solids from exiting the system. Floating scum and solids in the clarifier insert 20 can not pass through the submerged inlet 32 and solids which enter clarifier insert 20 and rise vertically by buoyancy can not enter vertical inlet end 32. A first coupling 36 connects to piping 35 where it extends through the vertical wall of clarifier insert 20. Additional piping 35 connects to the downstream side of first coupling 36 and connects to a second coupling 36A and then extends through the vertical wall 11B of old septic tank 11 via piping 35. As indicated with respect to influent line 16, appropriate sealing measures are taken with respect to effluent line 35 to insure watertight integrity. There are many more details of the various individual components of FIG. 1 to be disclosed, however, those details will be clearly set forth in the discussions of the various additional figures.

Figure 2:
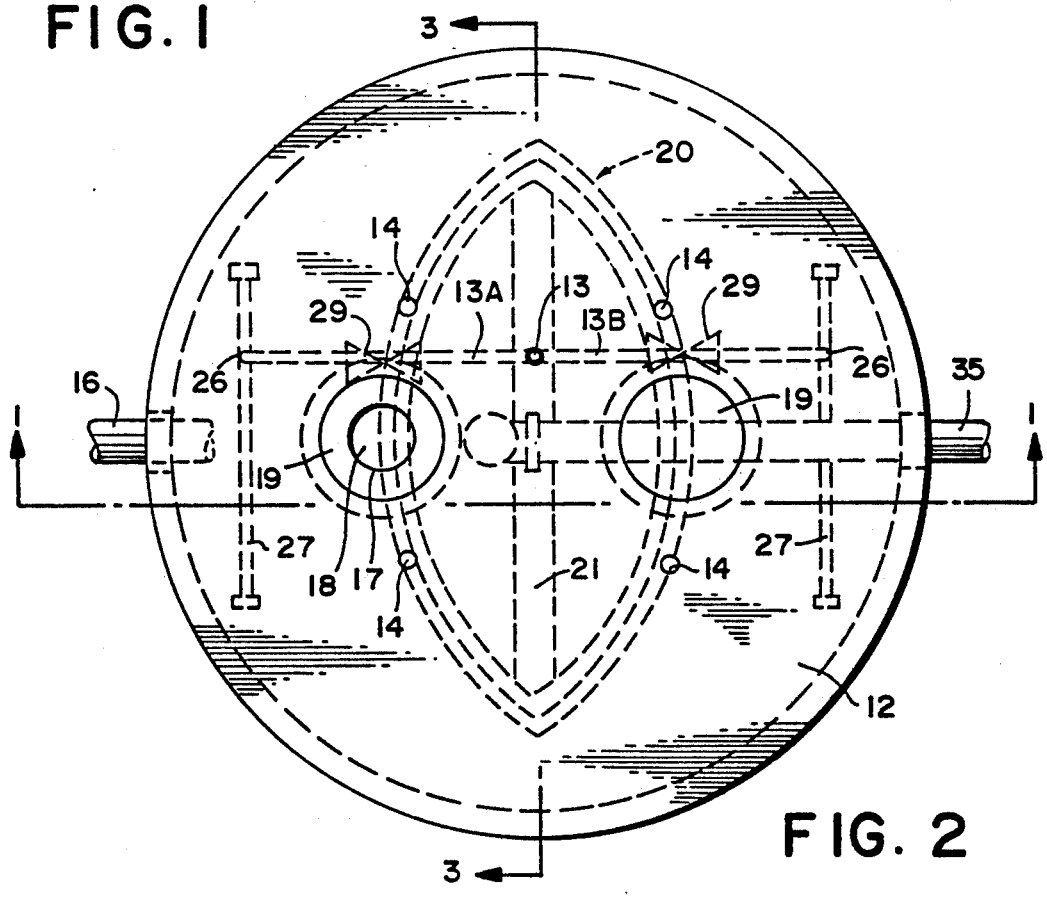
FIG. 2 is a plan view of the illustration in FIG. 1., with the tank lid in place, illustrating the relationship of the various components therein.

Turning now to FIG. 2, there is illustrated a plan view of the structure shown in FIG. 1 with the earth removed from the top of lid 12. However, this view provides a better indication of the shape of clarifier insert 20. Clarifier insert 20 has a generally elliptical shape as viewed from the top. However, its sides extend downwardly as it tapers inwardly and terminates in an opening 21 which has a relatively narrow elongated configuration.

As shown, influent line 16 and effluent line 35 are in horizontal alignment while air inlet line 13 is rearward thereof, as are horizontal air lines 13A, 13B, and air control valves 29. Air diffuser risers 26 connect horizontal piping 13A and 13B to supply air to air diffuser bar assemblies 27 which are positioned slightly above bottom 11A of tank 11. More details will be provided with respect to air diffuser bar assemblies 27 in the discussion of FIG. 7.

Figure 3:
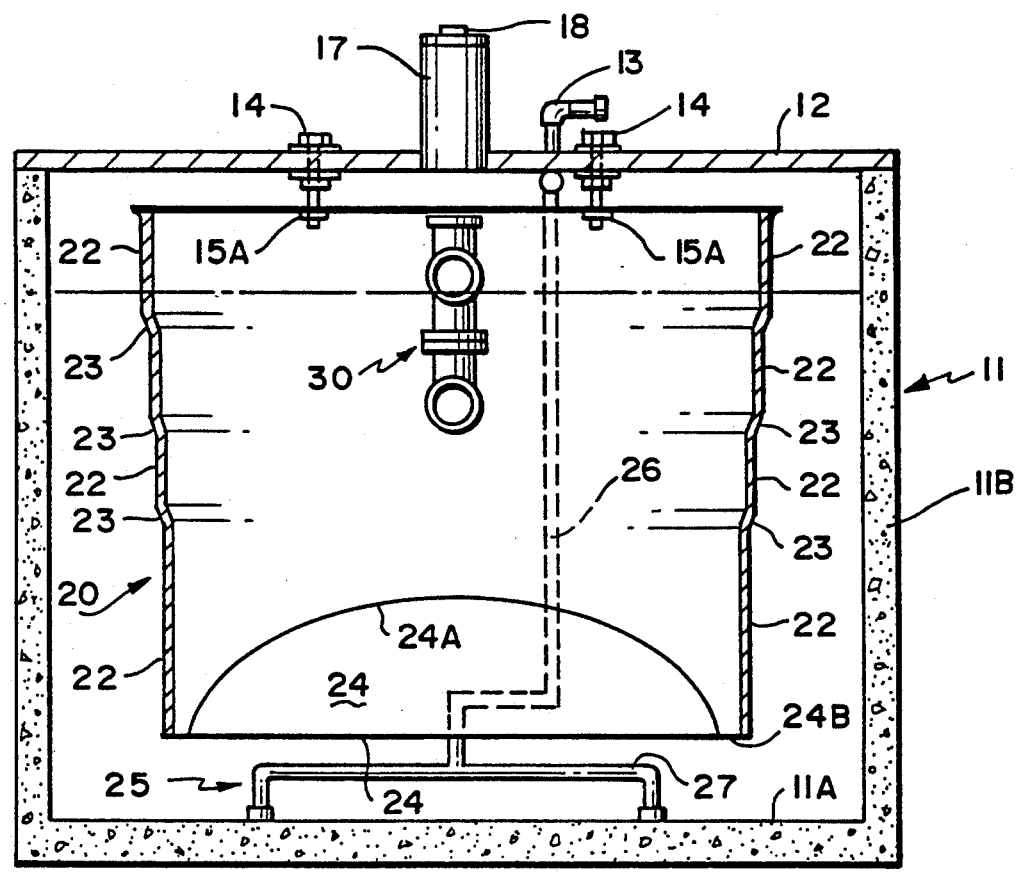
FIG. 3 is a vertical sectional view taken along the plane 3—3 of FIG. 2, illustrating the location of the clarifier insert and diffuser assembly.

Referring now to FIG. 3, there is shown another sectional view which is taken through the center of old septic tank 11 perpendicular to the illustration of FIG. 1. The main purpose of this sectional view is to provide a clearer illustration of clarifier insert 20. Clarifier insert 20 is provided with vertical portions 22 which are followed by an inwardly tapered portion 23 which alternate down the wall terminating in a vertical portion 22. The changes in direction in the portions 22 and 23 of clarifier insert 20 provides structural strength to clarifier insert 20 when the insert 20 is made of FIBERGLASS or other equivalent materials. This additional strength serves to eliminate deformation and vibrations caused by the violent fluid reactions in the aerated section of tank 11. The stability of clarifier insert 20 allows quiescent conditions to exist inside the clarifier insert 20, which is necessary for settling of solids and proper system functioning. As the lowest vertical wall portion 22 extends downward, the arcuate portion parallel to the longitudinal axis beginning with arcuate lines 24A, sharply turns inwardly to form elongated opening 21. The purpose of this arrangement is to form a funneling bottom to clarifier insert 20, The funneling bottom and opening 21 concentrate settling solids in the clarifier insert 20 and direct them into the aerated section of tank 11. Concentration of settling solids in the clarifier insert 20 increases their density which induces more rapid settling. The narrow width of elongated bottom opening 21 also minimizes the movement of the solids in the aerated section of tank 11 into the clarifier insert 20 and further serves as a point of separation of the violent hydraulic conditions in the aerated section of tank 11 and quiescent hydraulic conditions inside the clarifier insert 20, thus allowing proper system functioning.

Alternatively, clarifier insert 20 could be made of A-36 carbon steel. When A-36 carbon steel is used, the stepped configuration is not required to eliminate deformations and vibrations in the clarifier insert 20 due to the natural strength of such material. The clarifier insert 20 will end with its lower most portion tapered inwardly as shown at 24 with the portion above that being elliptical as shown in FIG. 2. Arcuate line 24A represents the point at which sharply tapered portion 24 begins its inward movement. Arcuate line 24A terminates inboard slightly from the lowermost ends of last vertical portion 22 on each side. The purpose of this is to prevent point termination, thus allowing for the open bottom 21 in clarifier insert 20.

Figure 4:
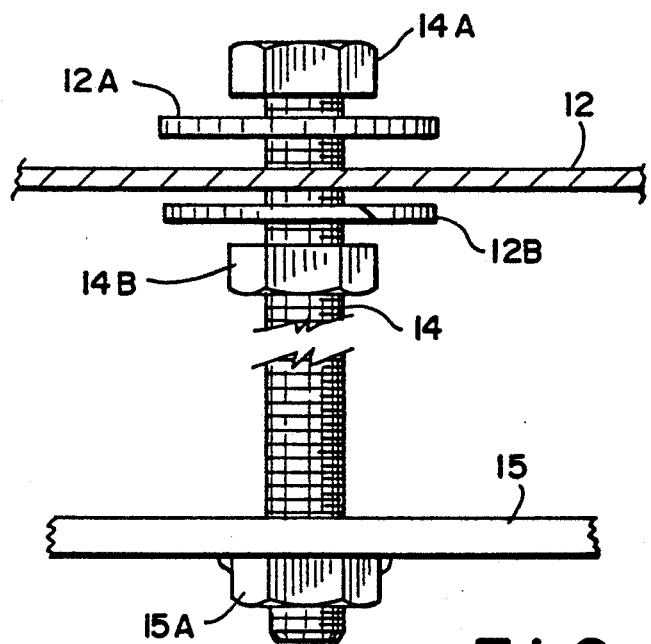
FIG. 4 is an enlarged illustration of the adjusting system for the clarifier insert and its attachment to the lid.

FIG. 4 is an illustration of the height adjustment system utilized to insure that the clarifier insert 20 and effluent assembly 30 are positioned at the proper height relative to tank bottom 11A and effluent pipe coupling 36A of the tank in which it is installed. The adjustment system also provides the ability to maintain clarifier insert 20 horizontally level even if the existing septic tank 11 is not horizontally level, allowing proper system functioning. As one can imagine, septic tanks come in a variety of sizes and shapes and for optimum operation the aeration/clarifier insert assembly 20 must be set at a particular height to allow adequate space between clarifier inlet 21 and tank bottom 11A to allow ample space for consolidated settled solids to pass from clarifier insert 20 to the aerated section of tank 11 and to maintain horizontal levelness between effluent piping couplings 36 and 36A to allow proper discharge of treated effluent from effluent discharge assembly 30 through discharge piping 35.

Only one suspension bolt 14 is illustrated, however, there are a total of four such bolts 14 and all are used the same way. Each bolt 14 extends through an aperture in lid 12 and is provided with a hex head 14A and utilizes two galvanized washers and two galvanized nuts of corresponding diameter to bolt 14. Lowermost nut 15A is welded to flange 15 which is securely fastened to the outer wall of the upper portion of clarifier insert 20. Above and below lid 12, a flat washer 12A and lock washer 12B are placed, with movable nut 14B threaded onto bolt 14 and placed below lock washer 12B. As shown both lid 12 and flange 15 are provided with appropriately sized apertures to permit the threaded portion of bolt 14 to pass therethrough. Since the height of lid 12 is fixed relative to the bottom 11A of tank 11, vertical adjustment of clarifier insert 20 is accomplished by turning in a clockwise direction head 14A. However, movable nut 14B must be backed away from lid 12. By continuing this turning of heads 14A on each of the four bolts 14, clarifier insert will be raised. Likewise, rotation in a counter-clockwise direction will permit clarifier insert 20 to be lowered. Once the proper height adjustment has been reached, locking nut 14B is rotated up threaded portion of bolt 14 to securely lock the adjustment in place. The length of bolt 14 is of sufficient length to cover all vertical adjustment requirements.

Referring now to FIG. 5 there is shown an air diffuser bar assembly 27. Riser 26 is connected to tee 37 through a pair of ninety degree elbows and a pair of short conduits (unnumbered). All of the piping material used in the aeration system is made of PVC including the elbows, tees, valves and conduit. The reason for the use of PVC is because of the corrosive conditions which exist in tank 11. PVC has been found to withstand the various corrosive conditions best. In addition, working with PVC piping is much easier and less labor intensive than any metallic conduit. Opposite legs of tee 37 each receive a conduit portion 38 and 39, respectively, which forms the diffuser bars 27. Ninety degree elbows 40 are attached to the respective free ends of conduits 38 and 39 with a short vertical conduit portion 41 extending downward from each of said last mentioned ninety degree elbows 40. The lower or free end of short conduit portions 41 terminate and are received in stabilizing blocks 42. It should be noted all PVC joint connections are properly made up with an appropriate glue to provide air tight connections as is the connection to stabilizing block 42 which effectively blocks short vertical portions 41. Each of the air diffuser bar assemblies 27 are placed relatively close to the wall 11A of tank 11 with the apertures 43 facing outwardly toward the vertical interior wall 11A of tank 11 to induce the flow regime illustrated in FIGS. 7 and 8. It should be noted that although the aeration assembly is disclosed as comprising a pair of air diffuser bars 27, other configurations may be utilized. For example, a single circular diffuser ring is another possible configuration. Of course, a plurality of risers would be required while the air aperture design would remain the same.

FIG. 6 is a sectional view of conduit 38 taken along the plane 6—6 of FIG. 5. This figure illustrates the angle relative to the horizontal centerline 43 at which outlet apertures are drilled. It has been found that an angle of eighteen degrees below the horizontal centerline is very effective in assisting to provide the desired flow regime in the aeration chamber and to prohibit clogging of outlet apertures 43 by solids in tank 11 if for some reason, the supply of air is terminated. It is to be noted that on the opposite side of tank 11, there is another identical diffuser bar assembly 27 with its apertures 43 similarly facing outwardly toward the vertical interior wall 11A of tank 11.

Turning now to FIG. 7, there is a vertical schematic illustration of the flow patterns in tank 11. As illustrated by heavy arrows 11B a generally circular flow regime on each side of clarifier insert 20 is provided by the positioning of air diffuser bar assemblies 27 relative to clarifier insert 20. Heavy arrows 11B represent the generally circular motion of the liquor, which consists of solids and liquid. Additionally, a pair of arrows 11C are shown as entering inlet 21 of clarifier insert 20. These arrows 11C, represent the upward flow of solids and liquids into the interior of clarifier inset 20, which proceed upwardly until their upward velocity diminishes sufficiently to allow them to settle by gravity, as shown by arrows 11D, leaving liquids, indicated by arrow 11E, to continue upwardly and enter outlet 32. Solids, indicated by arrows 11D, fall downwardly and exit clarifier insert 20, as indicate by arrows 11F, to be picked up by the liquor flow 11B and repeat the cycle.

FIG. 8 is another schematic view of tank 11 illustrating the flow pattern near the top of tank 11.

At this point, it appears that a discussion of the flow patterns, aeration and mixing process within tank 11 would be helpful. Raw unsettled domestic wastewater enters directly into the converted septic tank/aeration chamber via inlet conduit 16. A remotely located compressor (not shown) provides supply air to air inlet line 13. With both valves 29 open air will flow to air diffuser bar assemblies 27. Aeration and mixing are promulgated by the pasage of air through the two submerged air diffuser bars 27 located on the influent and effluent sides of the septic tank aeration chamber. The aeration process produces a flow regime in tank 11 where organic and inorganic solids and activated sludge (biological mass) are suspended in the septic tank/aeration chamber. The flow pattern, as indicated by heavy arrows 11B, travels up the outer portions of the septic tank/aeration chamber, and down the outside of clarifier insert 20, which is suspended in the center of the septic tank-/aeration chamber. Quiescent conditions are maintained in clarifier insert 20 at all times. Mixed liquor (water and solids), indicated by arrows 11C, enters clarifier insert 20 through elongated clarifier inlet 21, located at the bottom of clarifier insert 20, by means of simple hydraulic displacement when raw wastewater enters tank 11 via inlet conduit 16 and not the hydraulic flow regime in the aerated section of the tank 11. The mixed liquor travels upward toward the effluent elbow 31, as indicated by arrow 11C. The solids portion of the mixed liquor then settles by gravity, as indicated by arrows 11D, settle in clarifier insert 20 and travel back down exiting through elongated inlet 21. The settled solids are then re-suspended into the septic tank/aeration chamber by the flow regime in the septic tank/aeration chamber. Solids-free treated wastewater, indicated by arrow 11E, travels through inlet end 32 of elbow 31 and out the system effluent outlet 35.

The introduction of oxygen and mixing to the organic matter in the waste stream, supplied by the aeration system 25, creates an ideal environment for the growth of aerobic microorganisms. These microbes degrade the waste organic material into harmless gases, water and additional microbial cell material. These beneficial microbes also serve to significantly reduce the pathogenic bacteria population native to the raw wastewater. The above described process produces a clear, odorless effluent which meets or exceeds state and National Sanitary Foundation (NSF) No. 40 treated effluent quality standards.

Figure 9:
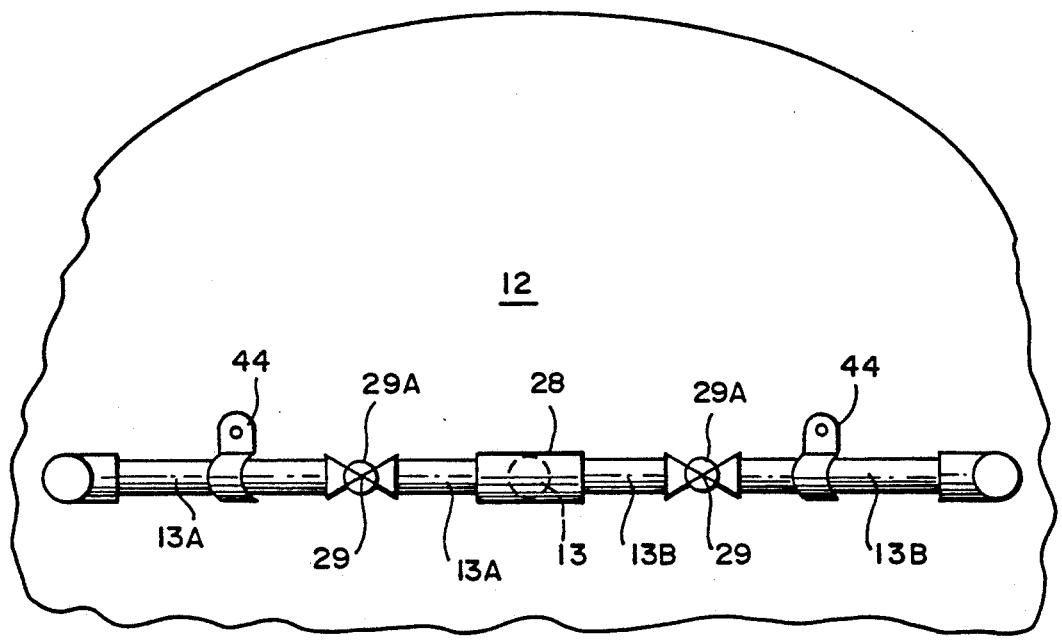
FIG. 9 is a view of the underside of the lid illustrating the manner of attachment of the air supply line for the diffuser bars.

Referring now to FIG. 9, there is shown a view of the underside of lid 12. This figure illustrates the manner in which aeration supply lines 13A, 13B are attached to lid 12. As shown, inlet line 13 is interconnected with air inlet tee 28. Left piping 13A connects to tee 28 and is provided with a flow control valve 29 that is positioned with its handle 29A turned downwardly away from lid 12 to permit piping 13A, 13B, tee 28 and the ninety degree elbows (unnumbered) to be in close contact with the underside of lid 12. Flow control valves 29A allow for equalization of air flow into air diffuser bars 27 on each side of tank 11 to ensure proper flow regime in tank 11. As illustrated, a pair of clamps 44 overlap conduit portions 13A and 13B to provide support for the conduits and eliminate any vibration. Clamps 44 are each anchored to the underside of lid 12 by appropriate fastening means.

Figure 10:
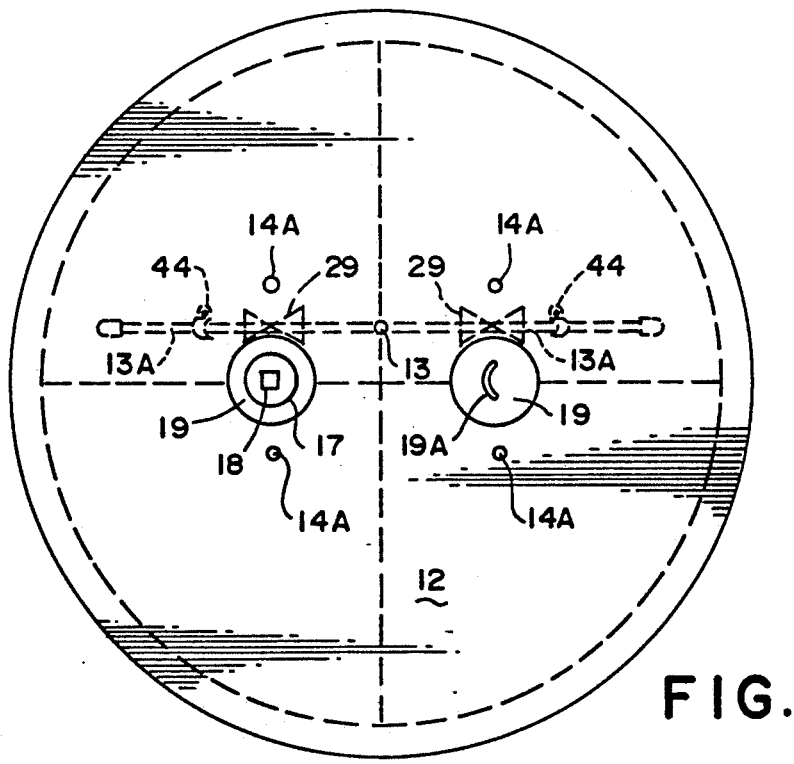
FIG. 10 is a plan view of the lid, reduced in size for purposes of illustration, showing the relative positions of the aeration feed line, inspection cover and inspection riser.

Referring now to FIG. 10, there is shown a plan view of lid 12 over tank 11 (indicated by broken lines) with a portion of aeration system 25 shown in dashed lines with air inlet line 13 in the center thereof. Additionally, both inspection port covers 19 can be seen clearly as well as the positioning of valves 29 to provide ready access thereto. Inspection port cover 19, located to the right of air inlet line 13 is provided with a handle 19A to assist in removal of cover 19. Inspection port cover 19, located to the left of air inlet line 13 has inspection riser 17 mounted therein with removable riser cap 18 threaded therein.

An optional, commercially available, chlorinator may be added to the effluent discharge line 35, either within tank 11, downstream of effluent discharge assembly 30, or exterior of tank 11 in line with effluent discharge line 35.

While the above described septic tank/aeration system has been described with respect to a conversion insert system for an existing septic tank of an individual home wastewater treatment system, all of the components are equally effective for new construction wastewater treatment systems. The only difference between the conversion type of set-up would be the fact that in new construction, a new tank and lid would be included with the system. All other operative components and their manner of installation and set-up would remain the same.

As alluded to earlier, septic tanks come in a variety of capacities and configurations. Applicant's novel conversion system is compatible with all such tanks. The only difference would be the height setting of the clarifier insert 20. Further, the septic tank 11 undergoing conversion is illustrated as a round, concrete tank, however, the conversion system is also compatible with FIBERGLASS or steel tanks of any shape. Additionally, the clarifier insert 20 is shown as elliptical in shape, however, the shape could also be cylindrical or rectangular in plan view and function in the same manner, provided that consistent volumes are maintained and a funneling hopper bottom are included in the design.

While the inventive concepts have been described in its preferred embodiment, it is to be understood that the words which have been used are words of description rather than limitation and that changes may be made within the purview of the appended claims without departing from the full scope or spirit of the invention.

Having thus described our invention, We claim:

1. An apparatus for converting a standard anaerobic septic tank system into a highly efficient aerobic wastewater treatment system comprising:

a new septic tank lid having an upper side and an underside sized to conform to the configuration of the septic tank system; aeration means including aid supply conduit lines and flow control means for conveying air to a pair of spaced air diffuser assemblies located near the bottom of said septic tank; said aeration means including said air diffuser assemblies attached to said underside of said new septic tank lid; a clarifier insert and adjustment means for adjustably attaching said clarifier insert to said underside of said new lid and centrally positioning said clarifier insert between said air diffuser assemblies within said old septic tank; said clarifier insert having an upper and lower opening with a vertical wall extending therebetween forming a quiescent zone therein; an effluent discharge assembly operably positioned in said clarifier insert with said discharge conduit extending through said wall of said clarifier insert and connected to the septic tank system discharge outlet; whereby insertion of the aforementioned components into said septic tank converts said anaerobic tank to a highly efficient aerobic system when said air supply conduit lines provide air to said air diffuser assemblies and generates a generally vertical flow regime in said septic tank on opposite sides of said clarifier insert thus producing aeration and aerobic biochemical breakdown of the solids during mixing of the solids and liquids within said septic tank and allowing mixed liquor to enter said lower opening in said clarifier insert whereby solids in the quiescent zone within said clarifier insert fall by gravity through said lower opening into said septic tank for further mixing and solid-free liquid enters said inlet of said effluent discharge conduit and exits said septic tank.

2. An apparatus as defined in claim 1 wherein said air flow control means comprises a pair of manually operated valves with one of said valves operably connected to each of said air conduit lines to balance aeration on both sides of said clarifier insert.

3. An apparatus as defined in claim 1 wherein said air diffuser assemblies comprises an air diffuser conduit having a plurality of spaced apertures therein; said apertures extending radially outwardly below the horizontal center line of said air diffuser conduit wall whereby said apertures generate a pair of generally vertical circular flow patterns in said tank and due to said angle at which said apertures are bored prevent the clogging of said apertures should the flow of supply air be terminated.

4. An apparatus as defined in claim 1 wherein said upper opening of said clarifier insert has flanges attached to the outer periphery thereof; each of said flanges having a bore therethrough and a nut fixedly attached to the underside thereof; said lower opening of said clarifier insert having a lower portion formed by an elongated narrow slot-like opening at the bottom thereof and providing a quiescent zone therein whereby during operation solids and liquids enter said slot-like opening and rise therein until solids coagulate to form larger solids which then fall by gravity out through said elongated slot-like opening and rejoin the generally vertical flow patterns on opposite sides of said clarifier insert permitting the liquids to enter said effluent discharge assembly and exit said tank.

5. An apparatus as defined in claim 4 wherein said clarifier insert vessel is made of A-36 carbon steel.

6. An apparatus as defined in claim 4 wherein said clarifier insert vessel is made of a high strength fiber reinforced plastic material which is resistant to corrosion.

7. An apparatus as defined in claim 1 wherein said effluent discharge assembly comprises a coupling which is fixedly mounted through the upper portion of said clarifier insert below said open upper portion thereof; a first conduit portion having one end connected to said coupling and the other end connected to the central opening of a vertically positioned tee; said tee having the remaining openings in a vertical orientation; a ninety degree elbow operably connected to the lower of said remaining openings with the other end of said ninety degree elbow having a horizontal orientation; said ninety degree elbow positioned such that its open end is below the scum line in said tank permitting clear, odorless effluent to enter therein and exit said tank.

8. An apparatus as defined in claim 1 wherein said adjustment means comprises a plurality of bolts which extend through said lid through a plurality of apertures; said bolts and lid apertures in vertical alignment with said apertures and fixed nuts on said flanges of said vessel; a locking nut positioned on each of said plurality of bolts below said lid undersurface whereby, with said locking nuts in their unlocked position, clockwise rotation of said bolts into said fixed nuts moves said vessel upward and counter-rotation of said bolts lowers said vessel, thus providing vertical adjustment.

9. An apparatus as defined in claim 8 wherein the number of said plurality of bolts which are equidistantly spaced relative to the center of said tank lid is four.

* * * * *